(12) United States Patent
Yang

(10) Patent No.: US 10,895,892 B1
(45) Date of Patent: Jan. 19, 2021

(54) DOCKING STATION AND EXPANSION METHOD

(71) Applicant: GOOD WAY TECHNOLOGY CO., LTD., New Taipei (TW)

(72) Inventor: Chang-Chieh Yang, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/665,098

(22) Filed: Oct. 28, 2019

(51) Int. Cl.
*G06F 1/16* (2006.01)
*G06F 1/18* (2006.01)

(52) U.S. Cl.
CPC .......... *G06F 1/1632* (2013.01); *G06F 1/1656* (2013.01); *G06F 1/189* (2013.01)

(58) Field of Classification Search
CPC ....................................................... H05K 5/00
See application file for complete search history.

(56) References Cited

U.S. PATENT DOCUMENTS 10,152,073 B2    12/2018  Kashiwagi et al.
2020/0012326 A1*  1/2020  Steele ................ G05B 19/0421

FOREIGN PATENT DOCUMENTS

CN       109474033 A    3/2019

* cited by examiner

*Primary Examiner* — Jerry Wu
(74) *Attorney, Agent, or Firm* — Li & Cai Intellectual Property (USA) Office

(57) ABSTRACT

A docking station and an expansion method are provided. The docking station includes expansion slots, a detector module, an operational information module and a processor module. Two terminals of a connector are respectively inserted into the expansion slot and a connection port of the electronic device to electrically connect the docking station to the electronic device. The detector module is configured to detect a connection between the docking station and the electronic device to output a detecting signal. The operational information module is configured to obtain operational information of the electronic device connected to the docking station according to the detecting signal. The processor module is configured to obtain a main controlling signal corresponding to the operational information from a main control device, and determine resources available to the electronic device according to the main controlling signal.

8 Claims, 6 Drawing Sheets

DOCKING STATION AND EXPANSION METHOD

FIELD OF THE DISCLOSURE

The present disclosure relates to a docking station, and more particularly to a docking station and an expansion method for distributing appropriate resources respectively to electronic devices.

BACKGROUND OF THE DISCLOSURE

Laptops have an advantage of being portable. People can carry their laptops around and use them anywhere. However, such portable electronic products must be made to be light in weight and small in volume, and need to be improved with respect to power supply.

SUMMARY OF THE DISCLOSURE

In response to the above-referenced technical inadequacies, the present disclosure provides a docking station. The docking station is connected to a main control device and one or more electronic devices. The docking station includes one or more expansion slots, a detector module, an operational information module and a processor module. Two terminals of a connector are respectively inserted into the expansion slot and a connection port of the electronic device to electrically connect the docking station to the electronic device. The detector module is connected to the one or more expansion slots, and configured to detect a connection between the docking station and the electronic device to output a detecting signal. The operational information module is connected to the detector module, and configured to obtain operational information of the electronic device connected to the docking station according to the detecting signal. The processor module is connected to the operational information module and the main control device, and configured to obtain a main controlling signal corresponding to the operational information and determine resources available to the electronic device according to the main controlling signal.

In certain embodiments, the operational information includes a required power of each of the electronic devices, and when the main control device determines that a total required power of the electronic devices is not higher than a maximum power that a power supply device is capable of supplying through the docking station according to the operational information, the main control device controls the docking station to supply the required power to each of the electronic devices.

In certain embodiments, the operational information includes the required power of each of the electronic devices, and when the main control device determines that the total required power of the electronic devices is higher than the maximum power that the power supply device is capable of supplying through the docking station according to the operational information, the main control device obtains an electric quantity of a power stored in a power storage unit of the electronic device, and accordingly distributes the power respectively to the electronic devices and determines an order of supplying the power to the electronic devices through the docking station.

In certain embodiments, the operational information includes an identification information of and the required power of each of the electronic devices, and when the main control device determines that the total required power of the electronic devices is higher than the maximum power that the power supply device is capable of supplying through the docking station according to the operational information, the main control device distributes a power respectively to the electronic devices and determines an order of supplying the power to the electronic devices through the docking station according to the identification information of the electronic devices.

In certain embodiments, when the main control device determines that a charging current of the electronic device having a highest priority with respect to the other electronic devices is smaller than a current of the electronic device having the highest priority, the main control device redistributes the power to the electronic devices through the docking station.

In addition, the present disclosure provides an expansion method, which includes the following steps: providing a docking station having one or more expansion slots, wherein two terminals of a connector are respectively inserted into the expansion slot and a connection port of an electronic device to electrically connect the docking station to the electronic device; detecting a connection between the docking station and the electronic device to output a detecting signal by a detector module of the docking station; obtaining operational information of the electronic device connected to the docking station according to the detecting signal by an operational information module of the docking station; and determining resources available to the electronic device according to the main controlling signal corresponding to the operational information from a main control device by a processor module of the docking station.

In certain embodiments, the expansion method further includes steps of: obtaining the operational information including a required power of each of the electronic devices by the operational information module; calculating a total required power of the electronic devices according to the operational information by the main control device; and when the total required power of the electronic devices is determined to be not higher than a maximum power that the power supply device is capable of supplying through the docking station, controlling the docking station to supply the required power respectively to the electronic devices.

In certain embodiments, the expansion method further includes steps of: obtaining the operational information including the required power of each of the electronic devices by the operational information module; calculating the total required power of the electronic devices according to the operational information by the main control device; and when the total required power of the electronic devices is determined to be higher than the maximum power that the power supply device is capable of supplying through the docking station, distributing a power respectively to the electronic devices and determining an order of supplying the power to the electronic devices through the docking station, according to an electric quantity of a power stored in a power storage unit of each of the electronic devices, by the main control device.

In certain embodiments, the expansion method further includes steps of: obtaining the operational information including an identification information of and a required power of each of the electronic devices; calculating a total required power of the electronic devices according to the operational information by the main control device; and when the total required power of the electronic devices is determined to be not higher than the maximum power that the power supply device is capable of supplying through the docking station, distributing a power respectively to the electronic devices and determining an order of supplying the power to the electronic devices through the docking station, according to the identification information of the electronic devices, by the main control device.

In certain embodiments, the expansion method further includes a step of: redistributing a power respectively to the electronic devices through the docking station by the main control device when a charging current of the electronic device having a highest priority with respect to the other electronic devices is determined to be smaller than a current of the electronic device having the highest priority.

As described above, the present disclosure provides the docking station and the expansion method, which use the main control device to distribute the power according to the actual power consumption of the electronic devices and supply the distributed power respectively to the electronic devices. Therefore, each of the electronic devices can obtain the required power. The power may be preferentially supplied to the main electronic device under limited power conditions.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
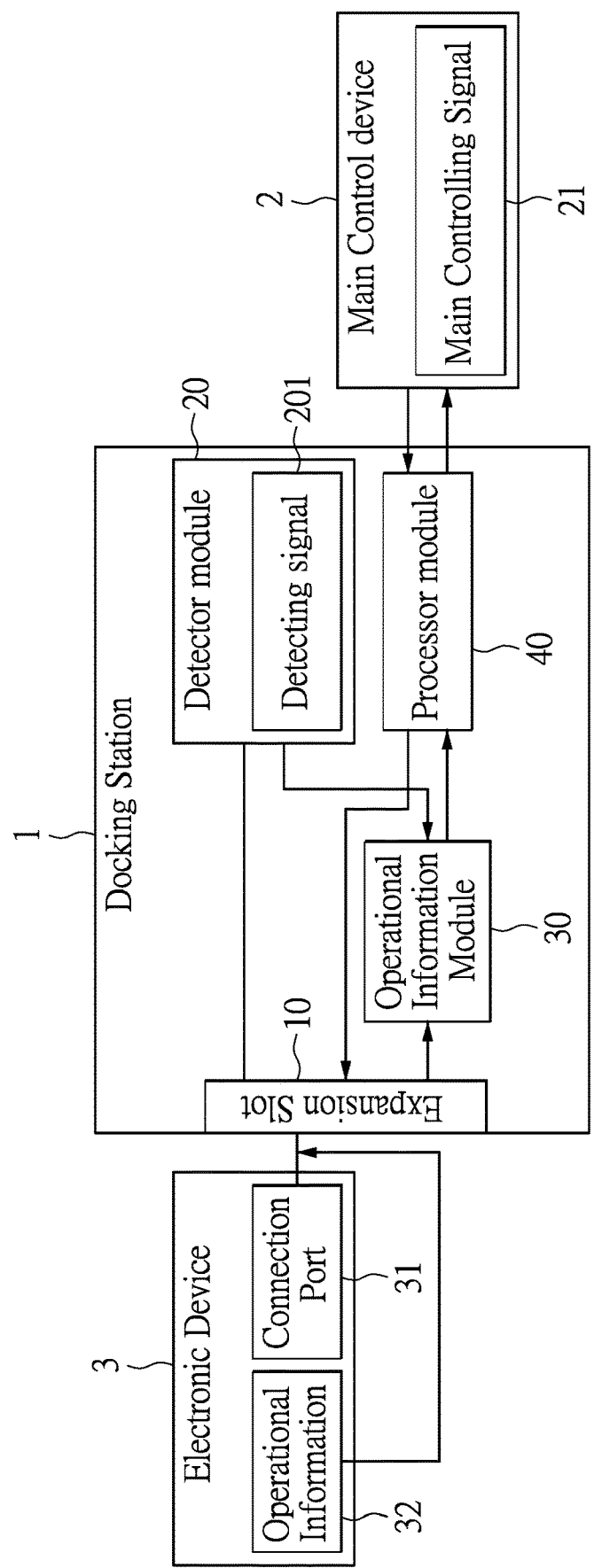
FIG. 1 is a block diagram of a docking station, an electronic device and a main control device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a docking station, an electronic device and a main control device according to an embodiment of the present disclosure. As shown in FIG. 1, a docking station 1 is connected to a main control device 2 and an electronic device 3. The docking station 1 includes an expansion slot 10, a detector module 20, an operational information module 30 and a processor module 40. The detector module 20 is contacted with or connected to the expansion slot 10. The operational information module 30 is connected to the detector module 20. The processor module 40 is connected to the operational information module 30 and the main control device 2.

Two terminals of a connector may be respectively inserted into the expansion slot 10 of the docking station 1 and a connection port 31 of the electronic device 3 to electrically connect the docking station 1 to the electronic device 3. If the electronic device 3 does not need to obtain any resource from the docking station 1, the connector may be pulled out from the expansion slot 10 of the docking station 1 and the connection port 31 of the electronic device 3.

It should be understood that the type of the connection port 31 of the electronic device 3 and the type of the expansion slot 10 of the docking station 1 should respectively match with the types of the two terminals of the connector. For example, if the connection port 31 of the electronic device 3 is a USB connection port and the expansion slot 10 of the docking station 1 is a USB expansion slot, a USB connector is used to connect the docking station 1 to the electronic device 3, but the present disclosure is not limited thereto.

For example, the detector module 20 is a voltage detector or a current detector. The detector module 20 is configured to detect a connection between the docking station 1 and the electronic device 3. More specifically, when the detector module 20 of the docking station 1 detects that the connection port 31 of the electronic device 3 is inserted into the expansion slot 10 of the docking station 1 to electrically connect the docking station 1 to the electronic device 3, the detector module 20 may output a detecting signal 201 to the operational information module 30.

For example, the operational information module 30 of the docking station 1 is a data extractor. When the detecting signal 201 received by the operational information module 30 indicates that the electronic device 3 is connected to the docking station 1, the operational information module 30 may output an operation requesting signal to the electronic device 3 to request the electronic device 3 to provide an operational information 32 thereof.

The operational information module 30 of the docking station 1 may transmit the operational information 32 from the electronic device 3 to the processor module 40 of the docking station 1. For example, the processor module 40 is a microprocessor module. The processor module 40 is configured to obtain a main controlling signal 21 corresponding to the operational information 32 from the main control device 2 and determine resources available to the electronic device 3 according to the main controlling signal 21.

Figure 2:
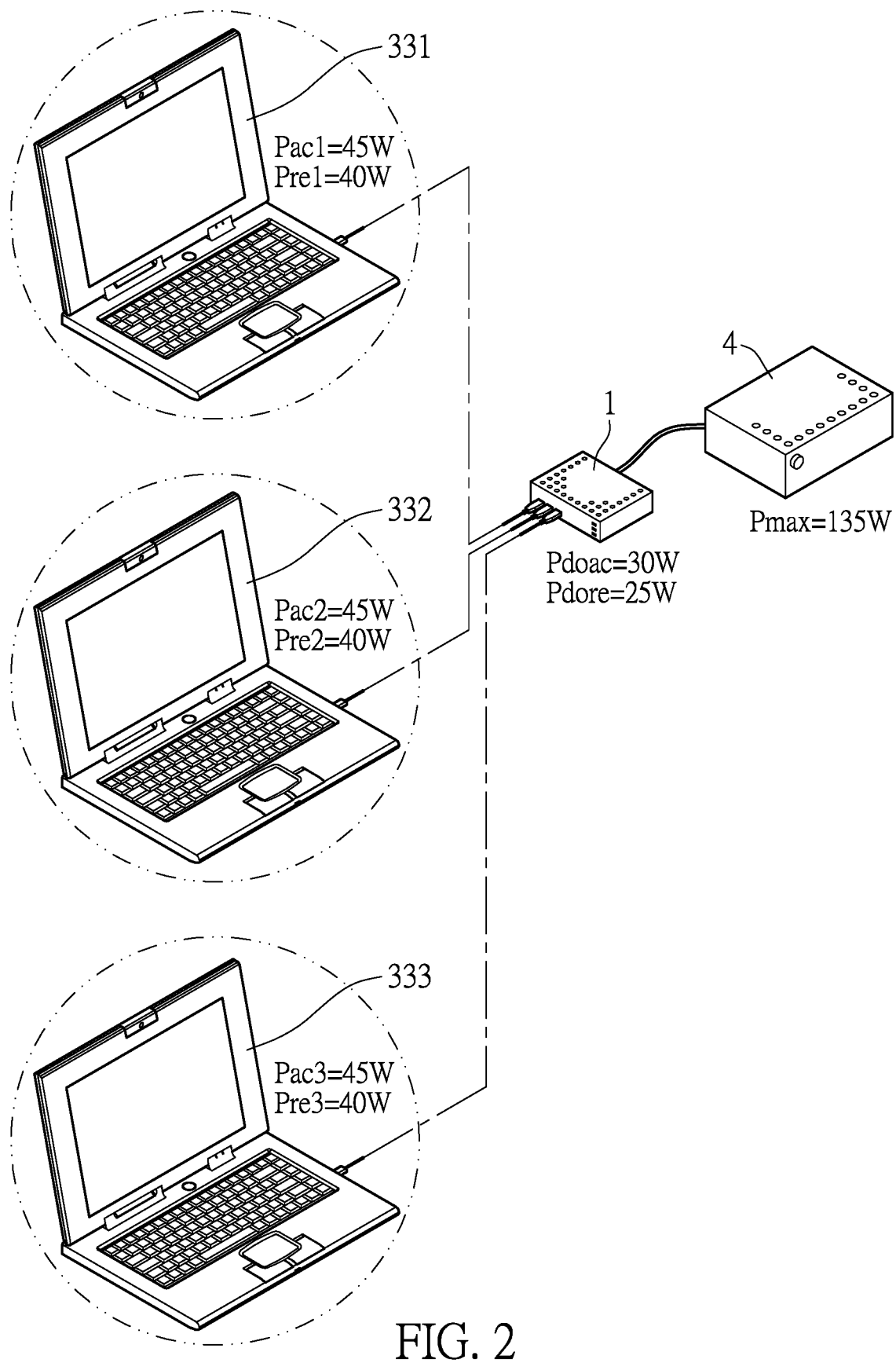
FIG. 2 is a schematic diagram of a docking station for evenly distributing a power from a power supply device according to actual power consumption of electronic devices according to the embodiment of the present disclosure.

Reference is made to FIGS. 1 and 2, wherein FIG. 1 is a block diagram of a docking station, an electronic device and a main control device according to an embodiment of the present disclosure, and FIG. 2 is a schematic diagram of a docking station for evenly distributing a power from a power supply device according to actual power consumption of electronic devices according to the embodiment of the present disclosure.

Figure 3:
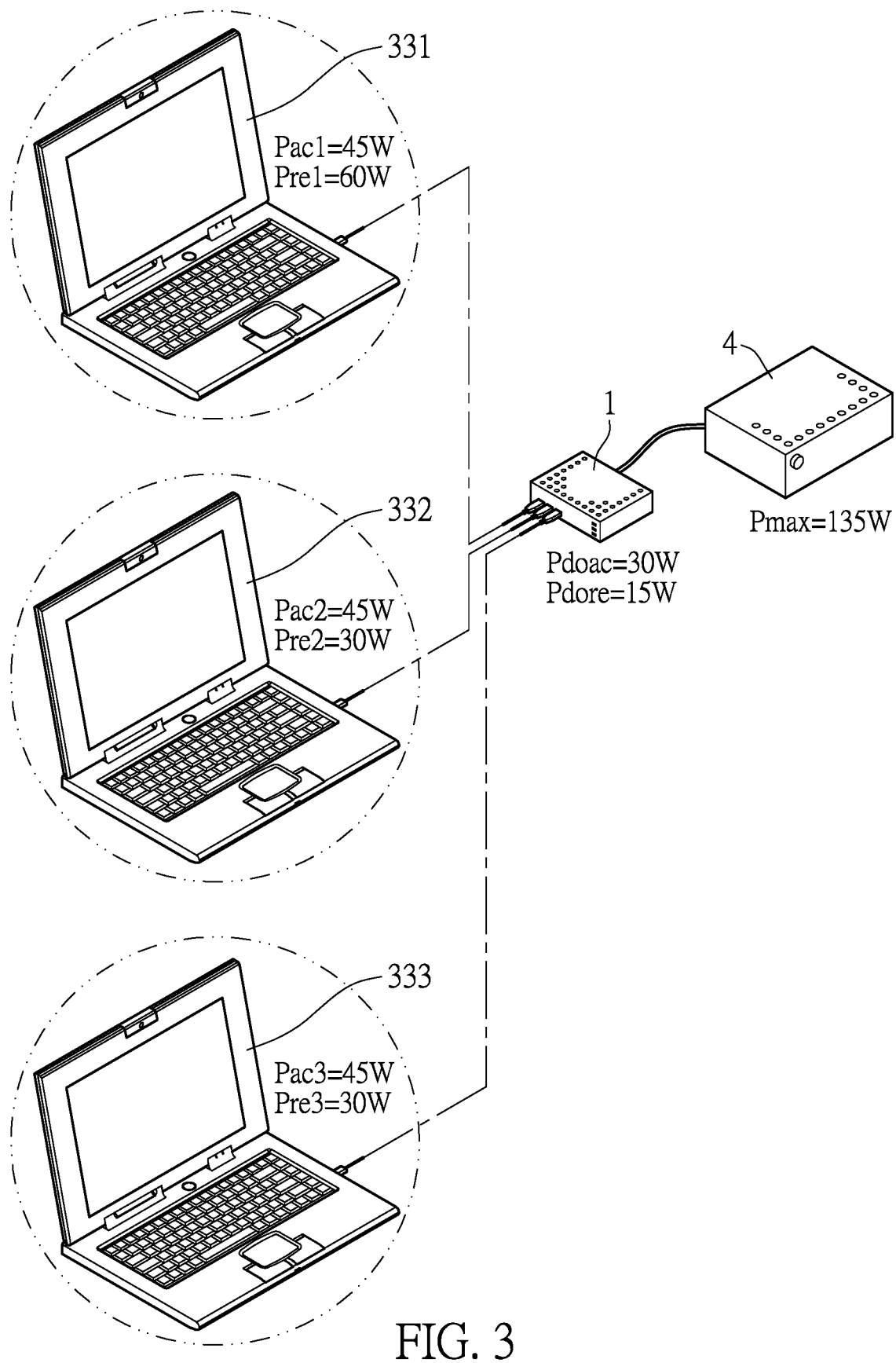
FIG. 3 is a schematic diagram of a docking station for redistributing a power from the power supply device to electronic devices having different actual power consumption according to the embodiment of the present disclosure.

In the embodiment, the electronic device 3 shown in FIG. 1 may include mobile devices 331, 332 and 333 that are notebook computers as shown in FIGS. 2 and 3, but the present disclosure is not limited thereto. In practice, the electronic device 3 may include other types of electronic devices such as mobile phones. One terminal of a connector may be inserted into a connection port of the mobile device 331, 332 or 333 and another terminal of the connector may be inserted into the expansion slot of the docking station 1 to electrically connect the mobile device 331, 332 or 333 to the docking station 1.

In the embodiment, the docking station 1 has three expansion slots such as USB expansion slots, which respectively matches with connection ports such as USB connection ports of the three mobile devices 331, 332 and 333. However, it should be understood that the docking station 1 may be replaced with a docking station that has different types and numbers of expansion slots from that of the docking station 1 as needed to match different types of connection ports of the electronic device 3. In the embodiment, the mobile devices 331, 332 and 333 are connected to the same docking station 1. However, in practice, more docking stations 1 may be disposed and the mobile devices 331, 332 and 333 may be connected to different docking stations 1.

As shown in FIG. 2, a power supply device 4 may be connected to the docking station 1 through a wire and supply a power to the docking station 1. As shown in FIG. 1, the main control device 2 may be connected to the docking station 1 in a wireless manner. The main control device 2 may control the docking station 1 to distribute a power from the power supply device 4 to the electronic device 3 such as the mobile devices 331, 332 and 333. In practice, the main control device 2 may be further connected to the power supply device 4 shown in FIG. 2 and determines how much power to be supplied to the docking station 1 from the power supply device 4.

The docking station 1 may include the expansion slots 10, the detector module 20, the operational information module 30 and the processor module 40. Further, the docking station 1 may include a power storage unit, such as an internal battery, which is configured to store a power from the power supply device 4.

When the detector module 20 of the docking station 1 detects that the mobile devices 331, 332 and 333 are electrically connected to the docking station 1, the operational information module 30 may obtain the operational information 32 of the mobile devices 331, 332 and 333, which pertain to operations of the mobile devices 331, 332 and 333 when executing a program or within a specified time interval. The processor module 40 of the docking station 1 may provide the operational information 32 of the mobile devices 331, 332 and 333 to the main control device 2.

It is worth noting that the common power supply device determines how much power needs to be supplied to the electronic device according to a rated power of the electronic device. For example, the common power supply device determines how much power needs to be supplied to the mobile devices 331, 332 and 333, according to rated powers Pac1, Pac2 and Pac3 such as 45 W. As a result, the mobile device 332 obtains a power, such as 45 W, which is equal to the rated power Pac2 and higher than a required power Pre2 such as 30 W of the mobile device 332. The mobile device 333 obtains a power, such as 45 W, which is equal to the rated power Pac3 and higher than a required power Pre3 such as 30 W of the mobile device 333. However, the mobile device 331 obtains a power, such as 45 W, which is equal to the rated power Pac1 and lower than a required power Pre1 of the mobile device 331. Under this condition, the mobile device 331 cannot execute programs normally.

Therefore, in the embodiment, as shown in FIG. 2, the operational information 32 may include the required power Pre1 of the mobile device 331 such as 40 W, the required power Pre2 of the mobile device 332 such as 40 W, and the required power Pre3 of the mobile device 332 such as 40 W. The main control device 2 determines how much power needs to be supplied to the mobile devices 331, 332 and 333 from the docking station 1 according to the required powers Pre1, Pre2 and Pre3.

The main control device 2 calculates a total required power by summing the required powers Pre1, Pre2 and Pre3. When the total required power is not higher than a maximum power Pmax such as 135 W that the power supply device is capable of supplying through the docking station, the main control device 2 may control the power supply device 4 to supply the total required power to the docking station 1. The docking station 1 supplies the required power Pre1 to the mobile device 331, the required power Pre2 to the mobile device 332, and the required power Pre3 to the mobile device 333.

In another embodiment, when a power stored in the power storage unit such as the internal battery of the docking station 1 is insufficient for operation of the docking station 1, the docking station 1 needs to obtain more power from the power supply device 4. Under this condition, the power supply device 4 may supply a maximum power Pmax such as 135 W to the docking station 1. The maximum power Pmax includes a required power Pdore such as 25 W of the docking station 1, and the total required power such as 110 W that is available to the mobile devices 331, 332 and 333.

The power storage unit of the docking station 1 may store a power such as 25 W from the power supply device 4. If necessary, the power storage unit of the docking station 1 may temporarily store a power to be supplied from the power supply device 4 to the mobile devices 331, 332 and 333. The docking station 1 may supply power to the mobile devices 331, 332 and 333 to charge the mobile devices 331, 332 and 333, during a time period of charging the power storage unit such as the internal battery of the docking station 1 by the power supply device 4 or other time periods. As a result, the docking station 1 and the mobile devices 331, 332 and 333 obtain sufficient power.

Reference is made to FIGS. 1 to 3, wherein FIG. 1 is a block diagram of a docking station, an electronic device and a main control device according to an embodiment of the present disclosure, FIG. 2 is a schematic diagram of a docking station for evenly distributing a power from a power supply device according to actual power consumption of electronic devices according to the embodiment of the present disclosure, and FIG. 3 is a schematic diagram of a docking station for redistributing a power from the power supply device to electronic devices having different actual power consumption according to the embodiment of the present disclosure.

As shown in FIG. 2, the required powers Pre1, Pre2 and Pre3 of the mobile devices 331, 332 and 333 are equal to each other, such as 40 W. Therefore, the main control device 2 controls the docking station 1 to distribute the same power such as 40 W respectively to the mobile devices 331, 332 and 333.

It should be understood that the mobile devices 331, 332 and 333 may require different powers for executing different programs during different time periods. As shown in FIG. 3, the required power Pre1 of the mobile device 331 increases to 60 W, and the required power Pre2 of the mobile device 332 and the required power Pre3 of the mobile device 333 respectively reduce to 30 W. In addition, the required power Pdore of the docking station 1 reduces to 15 W from 25 W. Under this condition, the main control device 2 may control the docking station 1 to reduce the power supplied to the mobile devices 332 and 333 and reduce a power reserved in the docking station 1, and supply a remaining power to the mobile device 331. As a result, the mobile devices 331, 332 and 333 respectively obtain the required powers Pre1, Pre2 and Pre3, and the docking station 1 obtains the required power Pdore.

Figure 4:
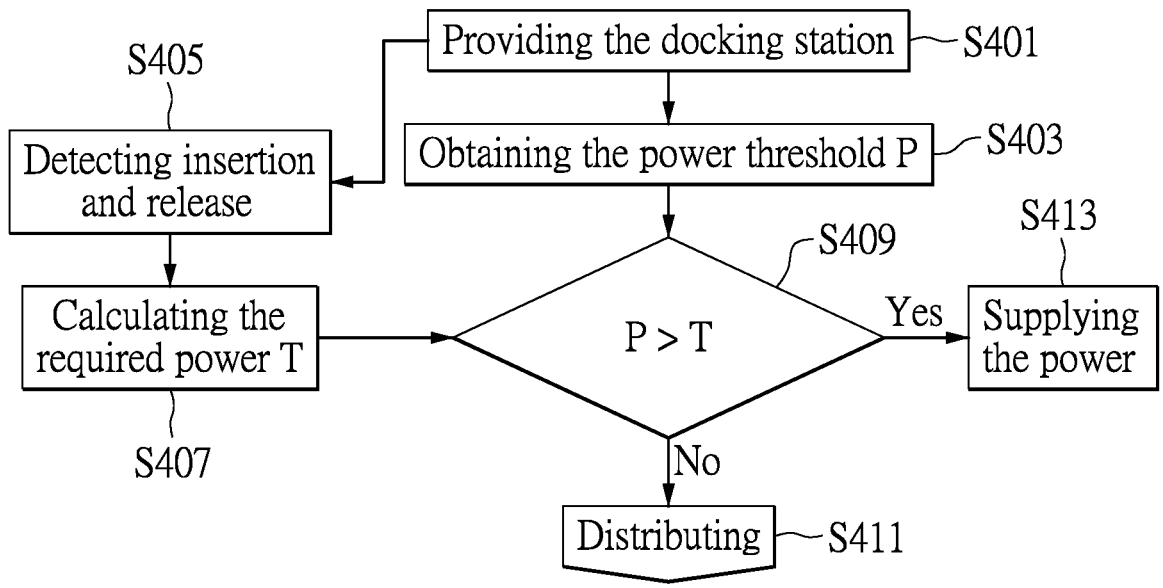
FIG. 4 is a flowchart diagram of comparing required power of each of the electronic devices with a power threshold of the power supply device in an expansion method according to the embodiment of the present disclosure.

Reference is made to FIG. 4, which is a flowchart diagram of comparing a power of each of the electronic devices with a power threshold of the power supply device in an expansion method according to the embodiment of the present disclosure. As shown in FIG. 4, in the embodiment, the expansion method includes steps S401 to S413 for the docking station 1 shown in FIG. 1.

In step S401, the one or more docking stations 1 are disposed. Each docking station may have a plurality of expansion slots.

In step S403, the one or more power supply devices 4 are disposed. Each docking station 1 may be connected to one of the power supply devices 4. A maximum power that can be supplied to the electronic devices 3 from the power supply device 4 through the docking station 1 is represented by a power threshold P.

In step S405, the detector module of each docking station 1 determines whether two terminals of the connector are respectively inserted into the expansion slot of the docking station 1 and the connection port 31 of the electronic device 3 such that the docking station 1 is electrically connected to the electronic device 3.

In step S407, the operational information module 30 of the docking station 1 obtains the operational information including the required power of each of the electronic devices 3 connected to the docking station 1. Then, the main control device 2 learns the required power of each of the electronic devices 3 and the docking station 1 from the processor module 40 of the docking station 1. The main control device 2 calculates a total required power T by summing the required power of the electronic devices 3 and the required power of the docking station 1.

Alternatively, the operational information 32 obtained by the docking station 1 from the electronic devices 3 includes program information executed by the electronic device 3. The docking station 1 provides program information to be executed by each of the electronic devices 3 and the docking station 1 to the main control device 2. Then, the main control device 2 evaluates the required power of each of the electronic devices 3 and the docking station 1 for executing programs, and calculates the total required power T by summing them.

In step S409, the main control device 2 determines whether or not the total required power T is lower than the power threshold P. If the main control device 2 determines that the total required power T is lower than the power threshold P, the main control device 2 determines that the power supply device 4 is capable of supplying sufficient power to each of the electronic devices 3, and step S413 is then performed. Conversely, if the main control device 2 determines that the total required power T is not lower than the power threshold P, the main control device 2 determines that the electronic device 3 may not obtain the sufficient power, and step S411 is then performed.

In step S411, the main control device 2 performs power distribution.

In step S413, the main control device 2 controls the power supply device 4 to supply the total required power T to the docking station 1, and then controls the docking station 1 to supply the required power to each of the electronic devices 3.

Figure 5:
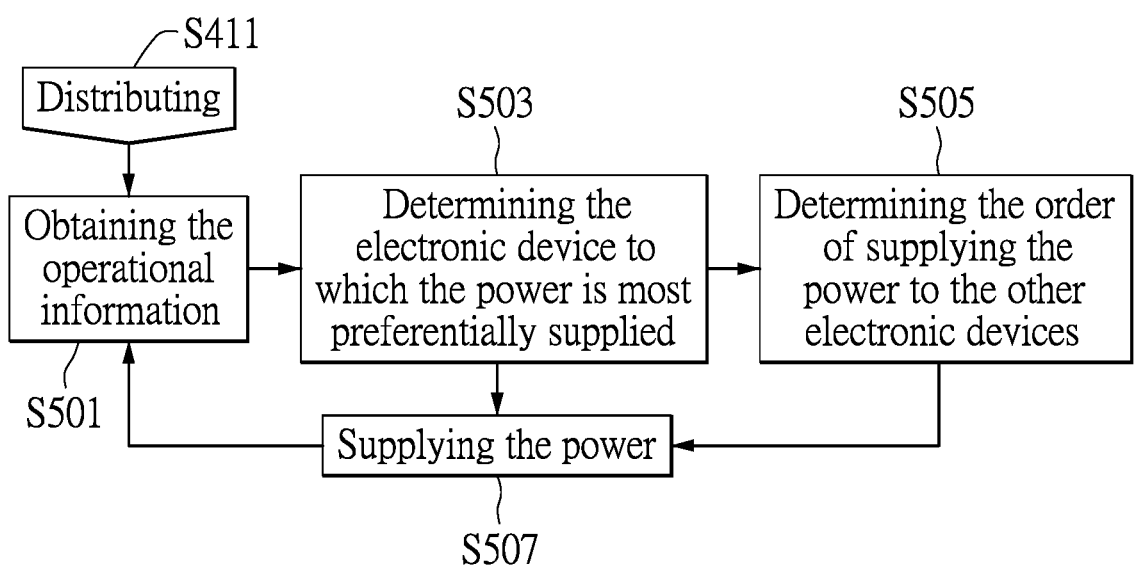
FIG. 5 is a flowchart diagram of determining an order of supplying the power in the expansion method according to the embodiment of the present disclosure.

Reference is made to FIGS. 4 and 5, wherein FIG. 4 is a flowchart diagram of comparing required power of each of the electronic devices with a power threshold of the power supply device in an expansion method according to the embodiment of the present disclosure, and FIG. 5 is a flowchart diagram of determining an order of supplying the power in the expansion method according to the embodiment of the present disclosure. As shown in FIG. 5, in the embodiment, the expansion method further includes steps S501 to S517 for the above-mentioned docking station 1.

In step S411, the main control device 2 performs power distribution.

In step S501, the docking station 1 obtains the operational information 32 of the electronic devices 3. The main control device 2 obtains the operational information 32 of the electronic devices 3 from the docking station 1.

In step S503, the main control device 2 determines the electronic device 3 to which the power is most preferentially supplied and determines how much power is supplied to it, according to the operational information 32 of the electronic devices 3.

In step S505, the main control device 2 determines an order of supplying the power to the other electronic devices 3 and determines how much power is supplied to them, according to the operational information 32 of the electronic devices 3.

In step S507, the docking station 1 supplies the power sequentially to the electronic devices 3 in accordance with the order determined by the main control device 2.

Figure 6:
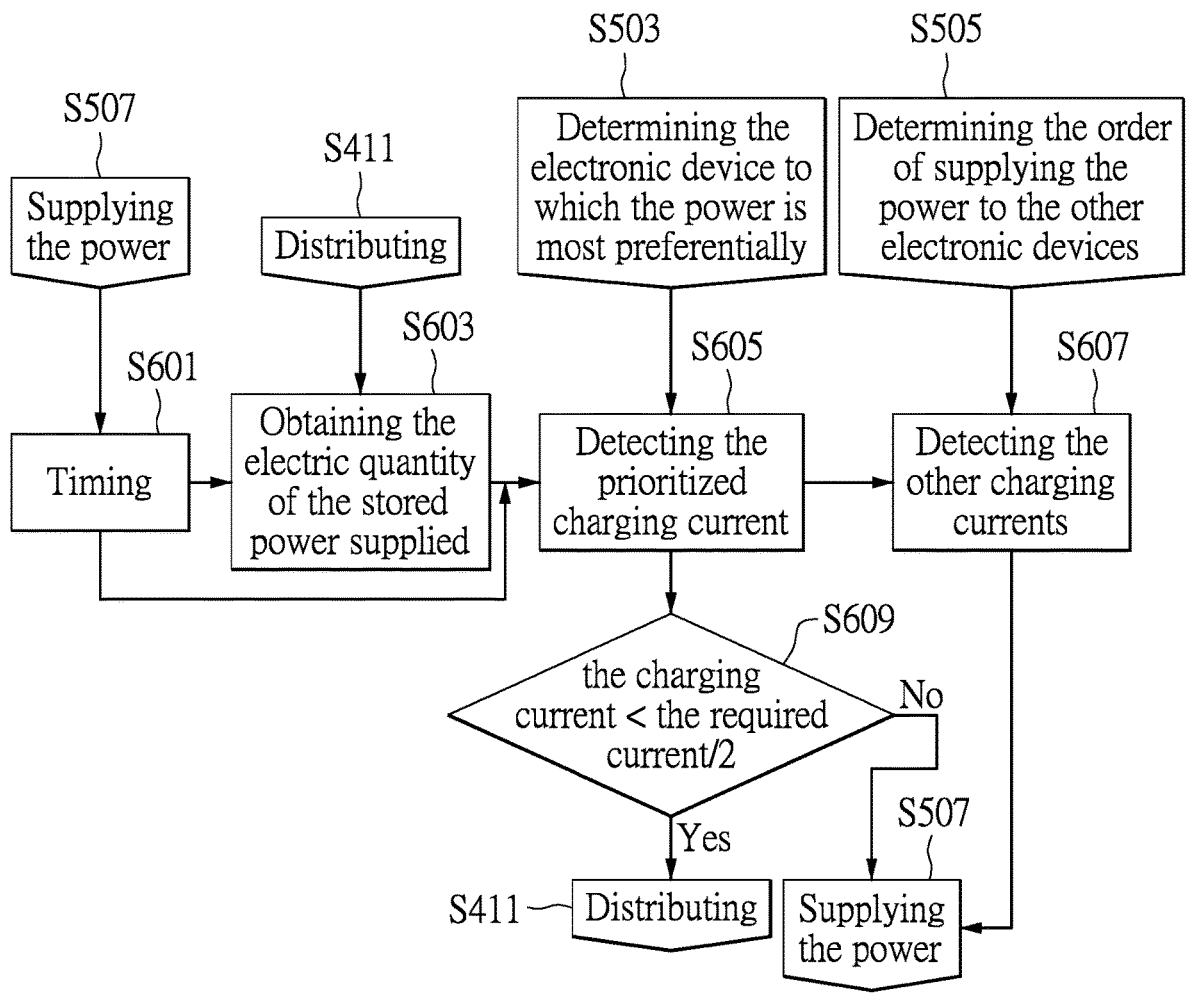
FIG. 6 is a flowchart diagram of detecting a charging current of each of the electronic devices in the expansion method according to the embodiment of the present disclosure.

Reference made to FIGS. 4 to 6, wherein FIG. 6 is a flowchart diagram of detecting a charging current of each of the electronic devices in the expansion method according to the embodiment of the present disclosure. As shown in FIG.

6, in the embodiment, the expansion method further includes steps S601 to S609 for the above-mentioned docking station 1.

In step S507, the main control device 2 controls the docking station 1 to supply the power from the power supply device 4 sequentially to the electronic devices 3.

In step S601, a timer included in the docking station 1 or in the main control device 2, or an external timer measures a time during which the power is supplied to each of the electronic devices 3 from the docking station 1.

In step S411, if the main control device 2 determines that the total required power T of the electronic devices 3 and the docking station 1 is not higher than the power threshold P, the main control device 2 distributes the power.

In step S603, the docking station 1 may provide the electric quantity of the power stored in the power storage device such as the internal battery of each of the electronic devices 3 to the main control device 2. The main control device 2 determines the order of supplying the power and how power is supplied. The main control device 2 may compares the electric quantities of the power stored in the electronic devices 3 to each other to determine an order of detecting charging currents of the electronic devices 3. For example, the main control device 2 determines that the electronic device 3 storing power having lowest electric quantity is to be preferentially detected. Then, step S605 is performed.

Alternatively, step S603 shown in FIG. 6 may be omitted. That is, step S605 is performed subsequently after performing step S601. Under this condition, the order of detecting the charging currents of the electronic devices 3 may be the same as an order of supplying the power determined according to the identification information in steps 501 to S505.

It should be understood that the order of detecting the charging currents of the electronic devices 3 may depend on the operational information 32 such as the electric quantities of and the identification information of the electronic devices 3.

In step S605, a current detector module included in the docking station 1 or an external current detector module detects the charging current supplied from the docking station 1 to the electronic device 3 having a highest priority.

In step S607, the current detector module included in the docking station 1 or the external current detector module detects the charging currents supplied from the docking station 1 to the other electronic devices 3.

In step S609, the main control device 2 or the processor module 40 of the docking station 1 determines whether or not the charging current of the electronic device 3 is smaller than a specific ratio, such as 1/2, of a required current of the electronic device 3. The required current may be depend on a current required for the electronic device 3 executing one or more programs within a time interval.

If the main control device 2 or the docking station 1 determines that the charging current of the electronic device 3 is not smaller than the specific ratio, such as 1/2, of the required current of the electronic device 3, the docking station 1 supplies a power to the electronic devices 3 in the order as described above.

Conversely, if the main control device 2 or the docking station 1 determines that the charging current of the electronic device 3 such as a host is smaller than the specific ratio, such as 1/2, of the required current of the electronic device 3, the charging current of the electronic device 3 needs to increase. Under this condition, step S411 is performed again. In step S411, a ratio of a power supplied to the electronic devices 3 is redistributed to increase the charging current of the electronic device 3 such as the host.

Figure 7:
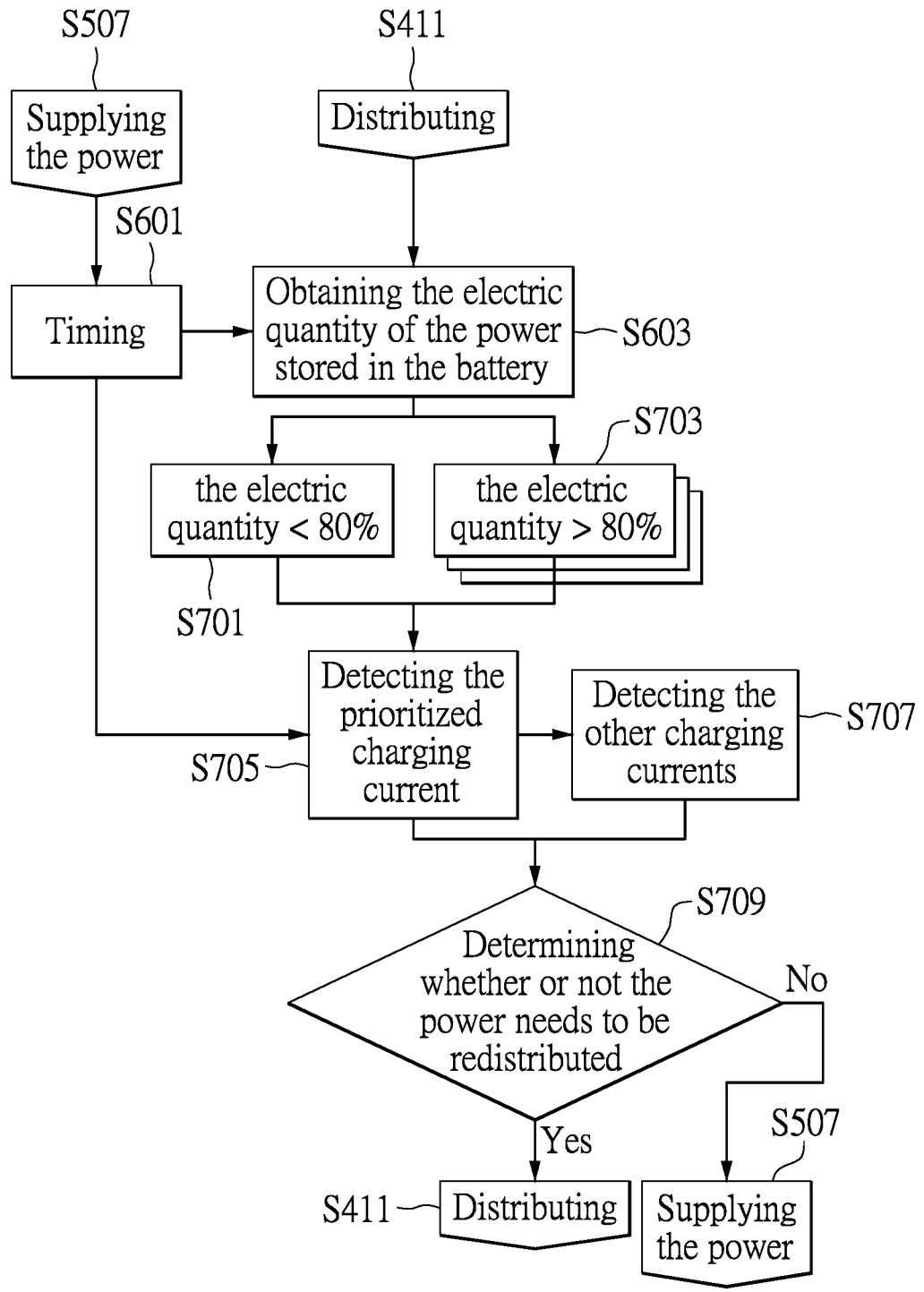
FIG. 7 is a flowchart diagram of detecting a charging current and an electric quantity of a power stored in a battery of each of the electronic devices in the expansion method according to the embodiment of the present disclosure.

Reference is made to FIGS. 4 to 7, wherein FIG. 7 is a flowchart diagram of detecting a charging current and an electric quantity of a power stored in a battery of each of the electronic devices in the expansion method according to the embodiment of the present disclosure. As shown in FIG. 7, in the embodiment, the expansion method further includes the steps S701 to S709 for the above-mentioned docking station 1.

In step S507, the docking station 1 transmits the power to the electronic devices 3.

In step S601, the timer included in the docking station 1 or in the main control device 2, or the external timer measures the time during which the power is supplied to each of the electronic devices 3 from the docking station 1.

In step S411, if the main control device 2 determines that the total required power T of the electronic devices 3 and the docking station 1 is not higher than the power threshold P of the power supply device 4, the main control device 2 distributes the power.

In step S603, the docking station 1 may obtain the electric quantity of the power stored in the power storage unit such as the internal battery of each of the electronic devices 3.

In step S701, the main control device 2 may determine which one of the electronic devices 3 including the power storage unit storing a power, which is lower than a ratio, such as 80%, of the required power of the electronic device 3, or lower than a ratio of a capacity of the internal battery of the electronic device 3, according to the electric quantities of the power stored in the power storage units as instructed in the operational information 32 of the electronic devices 3.

In step S703, the main control device 2 may determine which one of the electronic devices 3 includes the power storage unit storing a power higher than the ratio, such as 80%, of the required power of the electronic device 3, or higher than the ratio of the capacity of the internal battery of the electronic device 3, according to the electric quantities of the power stored in the power storage units as instructed in the operational information 32 of the electronic devices 3. Then, step S705 is performed.

In step S705, the main control device 2 may control current detector module included in the docking station 1 or the external current detector module preferentially detects the electronic devices 3, each of which includes the power storage unit storing the power that is lower than the ratio, such as 80%, of the required power of the electronic device 3.

In step S707, the main control device 2 may control current detector module included in the docking station 1 or the external current detector module detects the other electronic devices 3, each of which includes the power storage unit storing the power that is higher than the ratio, such as 80%, of the required power of the electronic device 3.

In step S707, the main control device 2 may determine whether or not the power needs to be redistributed to the electronic devices 3 according to a result of detecting the charging currents of the electronic devices 3. If the main control device 2 determines the power does not need to be redistributed to the electronic devices 3, the power is distributed in an original manner.

If the main control device 2 determines that the power needs to be redistributed, step S411 and the subsequent steps thereof as shown in FIGS. 5, 6 and 7 may be performed again. In those subsequent steps, the main control device 2 may control the docking station 1 to reduce the power supplied to the electronic devices 3 each storing the power that is higher than a ratio, such as 90%, of the required power of the electronic device 3. The main control device 2 may control the docking station 1 to increase the power supplied to the electronic devices 3 each storing the power that is lower than a ratio, such as 80%, of the required power of the electronic device 3.

In summary, the common power supply device determines the power supplied to the electronic devices according to the rated power of the electronic devices. As a result, some electronic devices may obtain too much power while other electronic devices cannot receive enough power for executing programs. In contrast, the present disclosure provides the docking station and the expansion method, which use the main control device to distribute the power according to the actual power consumption of the electronic devices and supply the distributed power respectively to the electronic devices. Therefore, each of the electronic devices can obtain the required power. The power may be preferentially supplied to the main electronic device under limited power conditions.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A docking station, which is connected to a main control device and a plurality of electronic devices, the docking station comprising: a plurality of expansion slots, wherein two terminals of a connector are respectively inserted into each of the expansion slots and a connection port of each of the plurality of electronic devices to electrically connect the docking station to the plurality of electronic devices; a detector module connected to the expansion slots and configured to detect a connection between the docking station and each of the plurality of electronic devices to output a detecting signal; an operational information module connected to the detector module and configured to obtain an electric quantity of power stored in an internal battery of each of the plurality of electronic devices that are connected to the docking station according to the detecting signal; and a processor module connected to the operational information module and wirelessly connected to the main control device, wherein the main control device is disposed separately from the docking station, the processor module is configured to transmit the electric quantities of the internal batteries of the plurality of electronic devices to the main control device from the operational information module, the main control device compares the electric quantities of the internal batteries with each other and accordingly determines an order of using a current detector module to detect a charging current of each of the plurality of electronic devices; wherein when the main control device determines that the charging current supplied from the docking station to one of plurality of the electronic devices having a highest priority is smaller than one half of a required current of the corresponding electronic device having the highest priority, the main control device redistributes a ratio of power supplied to the corresponding internal batteries of the plurality of electronic devices through the docking station from a power supply device such that the charging current of the corresponding electronic device having the highest priority increases, wherein the required current depends on a current required for the corresponding electronic device that is executing one or more programs within a time interval.

2. The docking station of claim 1, wherein the operational information module obtains a required power of each of the electronic devices and transmits the required power to the main control device through the processor module, the main control device calculates a total required power of the electronic devices according to the electric quantities of the internal batteries of the electronic devices, when the main control device determines that the total required power of the electronic devices is not higher than a maximum power that the power supply device is capable of supplying through the docking station, the main control device controls the docking station to supply the required power respectively to the electronic devices.

3. The docking station of claim 1, wherein the operational information module obtains a required power of each of the electronic devices and transmits the required power to the main control device through the processor module, the main control device calculates a total required power of the electronic devices according to the electric quantities of the internal batteries of the electronic devices, when the main control device determines that a total required power of the electronic devices is higher than a maximum power that the power supply device is capable of supplying through the docking station, the main control device distributes power respectively to the electronic devices and determines an order of supplying the power to the electronic devices through the docking station according to the electric quantities of the internal batteries of the electronic devices.

4. The docking station of claim 1, wherein the operational information module obtains a required power of each of the electronic devices and transmits the required power to the main control device through the processor module, when the main control device determines that a total required power of the electronic devices is higher than a maximum power that the power supply device is capable of supplying through the docking station, the main control device distributes power respectively to the electronic devices and determines an order of supplying the power to the electronic devices through the docking station according to an identification information of the electronic devices.

5. An expansion method, comprising the following steps: providing a docking station having a plurality of expansion slots, wherein two terminals of a connector are respectively inserted into each of the expansion slots and a connection port of each of plurality of electronic devices to electrically connect the docking station to each of the plurality of electronic devices; detecting a connection between the docking station and each of the plurality of electronic devices to output a detecting signal by a detector module of the docking station; obtaining an electric quantity of power stored in an internal battery of each of the plurality of electronic devices that are connected to the docking station according to the detecting signal by an operational information module of the docking station; transmitting the electric quantities of the internal batteries of the plurality of electronic devices to a main control device through a processor module from the operational information module, wherein the main control device is disposed separately from the docking station and wirelessly connected to the processor module; using the main control device to compare the electric quantities of the internal batteries with each other and accordingly determine an order of using a current detector module to detect charging currents of the plurality of electronic devices; and using the main control device to determine whether or not the charging current supplied from the docking station to one of the plurality of electronic devices having a highest priority is smaller than one half of a required current of the electronic device having the highest priority, in response to determining that the charging current of the corresponding electronic device having the highest priority is smaller than the one half of the required current, using the main control device to redistribute a ratio of power supplied to the internal batteries of the plurality of electronic devices through the docking station from a power supply device such that the charging current of the corresponding electronic device having the highest priority increases, wherein the required current depends on a current required for the corresponding electronic device that is executing one or more programs within a time interval.

6. The expansion method of claim 5, further comprising steps of:
   obtaining a required power of each of the electronic devices by the operational information module;
   transmitting the required power to the main control device through the processor module from the operational information module;
   calculating a total required power of the electronic devices by the main control device; and
   when the main control device determines that the total required power of the electronic devices is not higher than a maximum power that the power supply device is capable of supplying through the docking station, controlling the docking station to supply the required power respectively to the electronic devices by the main control device.

7. The expansion method of claim 5, further comprising steps of:
   obtaining a required power of each of the electronic devices by the operational information module;
   transmitting the required power to the main control device through the processor module from the operational information module;
   calculating a total required power of the electronic devices by the main control device; and
   when the main control device determines that the total required power of the electronic devices is higher than a maximum power that the power supply device is capable of supplying through the docking station, using the main control device to distribute power respectively to the electronic devices and determine an order of supplying the power to the electronic devices through the docking station, according to the electric quantity of the power stored in the internal batteries of each of the electronic devices.

8. The expansion method of claim 5, further comprising steps of:
   obtaining an identification information of and a required power of each of the electronic devices by the operational information module;
   transmitting the required power to the main control device through the processor module from the operational information module;
   calculating a total required power of the electronic devices by the main control device; and
   when the main control device determines that the total required power of the electronic devices is not higher than a maximum power that the power supply device is capable of supplying through the docking station, using the main control device to distribute power respectively to the electronic devices and determine an order of supplying the power to the electronic devices through the docking station, according to the identification information of the electronic devices.

\* \* \* \* \*